United States Patent
Nagata et al.

(10) Patent No.: US 7,058,497 B2
(45) Date of Patent: Jun. 6, 2006

(54) APPARATUS AND METHOD FOR DETERMINING A FAILURE IN AN AUTOMATIC TRANSMISSION

(75) Inventors: Koji Nagata, Toyota (JP); Yuuji Kashihara, Toyota (JP); Yoji Takanami, Anjyo (JP); Kazutoshi Nozaki, Toyota (JP); Akio Murasugi, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 175 days.

(21) Appl. No.: 10/667,454

(22) Filed: Sep. 23, 2003

(65) Prior Publication Data

US 2004/0073350 A1    Apr. 15, 2004

(30) Foreign Application Priority Data

Oct. 11, 2002   (JP)   ............................ 2002-298744

(51) Int. Cl.
*G06F 17/00*   (2006.01)
*G06F 19/00*   (2006.01)

(52) U.S. Cl. ..................... 701/62; 701/51; 701/52; 701/101; 477/75

(58) Field of Classification Search ................ 701/51, 701/52, 62, 63, 76, 101; 477/75, 115, 113
See application file for complete search history.

(56) References Cited

U.S. PATENT DOCUMENTS

| 5,629,852 A | * | 5/1997 | Yokoyama et al. ......... 701/101 |
| 6,024,671 A | * | 2/2000 | Sawa et al. ................. 477/131 |

FOREIGN PATENT DOCUMENTS

| JP | A 62-163831 | 7/1987 |
| JP | 1-172663 A | 7/1989 |
| JP | A 4-159139 | 6/1992 |
| JP | 7-107425 | 11/1995 |
| JP | A 8-210489 | 8/1996 |

* cited by examiner

*Primary Examiner*—Gertrude A. Jeanglaude
(74) *Attorney, Agent, or Firm*—Kenyon & Kenyon LLP

(57) ABSTRACT

When a shift routine is not being executed in an automatic transmission and a difference between an actual turbine speed and a calculated synchronous speed is equal to, or greater than, a preset value α, a difference ΔNT between an estimated turbine speed and the actual speed when the automatic transmission is in a neutral state is calculated. When ΔNT is equal to, or less than, a preset value β, it is determined that a failure related to the neutral state of the automatic transmission has occurred. Also, when ΔNT is greater than a preset value β, it is determined that a failure related to slipping of a frictional engaging element has occurred.

8 Claims, 5 Drawing Sheets

FIG. 3

| | C1 | C2 | C3 | B1 | B2 | B3 | B4 | F1 | F2 | F3 |
|---|---|---|---|---|---|---|---|---|---|---|
| P | | | | | | | | | | |
| R | | | ○ | ◎ | | | ○ | ○ | | |
| N | | | | | | | | | | |
| 1st | ○ | | | | | | ◎ | | | ○ |
| 2nd | ○ | | | ◎ | | ○ | | ○ | ○ | |
| 3rd | ○ | | ○ | | ◎ | ● | | ○ | | |
| 4th | ○ | ○ | ● | | | ● | | | | |
| 5th | | ○ | ○ | ○ | | ● | | | | |
| 6th | | ○ | | ● | ○ | ● | | | | |

○ : APPLIED
◎ : APPLIED WHEN ENGINE BRAKE IS ON
● : APPLIED BUT NOT EFFECTIVE

APPARATUS AND METHOD FOR DETERMINING A FAILURE IN AN AUTOMATIC TRANSMISSION

INCORPORATION BY REFERENCE

The disclosure of Japanese Patent Application No. 2002-298744 filed on Oct. 11, 2002, including the specification, drawings and abstract is incorporated herein by reference in its entirety.

BACKGROUND OF THE INVENTION

1. Field of the Invention

The invention relates to technology for detecting a failure in an automatic transmission, and more specifically, to technology for accurately detecting a cause of an increase in engine speed while running.

2. Description of the Related Art

An apparatus which detects a failure while running is typically provided in an automatic transmission mounted in a vehicle. The failure to be detected is, for example, an electrical failure such as a failure of a sensor or an actuator or the like, or a mechanical failure such as sticking of a shift valve or a shift solenoid, or slipping of a frictional engaging element. When these types of failures occur, a safety device activates and notifies the driver of the failure. The location of the failure can then be confirmed and the necessary repairs can be made.

Japanese Patent Laid-Open Publication No. 1-172663, for example, discloses a failsafe control device for an electronically controlled automatic transmission, which detects a failure of a structural part of the automatic transmission. This control device includes a transmission input speed sensor, a circuit which calculates an actual gear ratio of the transmission based on one of a transmission input speed, a transmission output speed, and a vehicle speed, a circuit which obtains a regular gear ratio, a circuit which compares the regular gear ratio with the calculated gear ratio, and a circuit which detects a failure of a structural part of the automatic transmission based on the comparative results.

The failsafe control device calculates the actual gear ratio of the automatic transmission based on one of the detected input speed, output speed, and vehicle speed. On the other hand, the regular gear ratio is calculated based on a shift lever position and an output state of a shift solenoid, for example. Therefore, when the difference between the actual gear ratio and the regular gear ratio deviates from a preset value, a failure is detected in the automatic transmission.

When the automatic transmission has been instructed to shift to a predetermined gear speed, two kinds of failures may occur: a failure in which the transmission of torque is interrupted (hereinafter referred to as "first failure") and a failure in which application of the frictional engaging element is insufficient such that the frictional engaging element slips (hereinafter referred to as "second failure").

The first failure occurs due to an abnormality in the control valve which directly controls the hydraulic pressure supplied to the frictional engaging element with which the predetermined gear speed is established. In this case, because the frictional engaging element is not fully applied, torque may not be transmitted, which may result in the transmission being in a neutral state. At this time the speed of the power source increases because there is almost no load on the power source. On the other hand, the second failure occurs due to a failure of a regulator valve which regulates the hydraulic fluid discharged from an oil pump.

When the regulator valve fails, the base pressure (so-called line pressure) of the hydraulic fluid of the automatic transmission decreases. As a result, the hydraulic pressure supplied to the frictional engaging element also decreases. In this case, the amount of torque (i.e., torque capacity) able to be transmitted by the frictional engaging element decreases. As a result, only a portion of the torque input to the automatic transmission is transmitted, which may result in an increase in speed of the power source.

While it is possible for the control device to detect whether there is a failure in the automatic transmission, it is not easy to determine the cause of that failure when there are conceivably two or more causes. That is, when the speed of the power source increases while the vehicle is running in a predetermined gear speed, it is not easy to identify a state of the automatic transmission which could bring about such an increase.

SUMMARY OF THE INVENTION

In view of the foregoing problems, the invention thus provides an apparatus and method for determining a failure in an automatic transmission, which is capable of accurately determining a cause of an increase in speed of a power source.

An apparatus for determining a failure in an automatic transmission in a vehicle while running according to a first aspect of the invention includes a detecting portion which detects an operating state of the automatic transmission; an estimating portion which estimates the operating state when the automatic transmission is in a neutral state in which transmission of power is interrupted, based on torque input from a power source of the vehicle to the automatic transmission; and a failure determining portion which determines, while distinguishing between, a first failure related to the neutral state of the automatic transmission and a second failure that is different from the first failure, based on the detected operating state and the estimated operating state.

The detecting portion of the failure determining apparatus detects an operating state (e.g., an input speed) of the automatic transmission. The estimating portion estimates the operating state of the automatic transmission based on torque input from the power source to the automatic transmission. This operating state is a state in which the automatic transmission is in a neutral state in which the transmission of power is interrupted. The failure determining portion determines, while distinguishing between, a first failure related to the neutral state of the automatic transmission and a second failure that is different from the first failure, based on the detected operating state and the estimated operating state (e.g., based on the difference of those operating states, relationship of amounts, or the like). The second failure is, for example, a failure related to slipping of a frictional engaging element with which a gear speed of the automatic transmission is established. When the detected operating state is substantially the same as the estimated operating state, the failure determining portion determines that the first failure relating to the neutral state has occurred in the transmission. When the detected operating state is not substantially the same as the estimated operating state, the failure determining portion determines that the second failure (e.g., a failure relating to slipping of the frictional engaging element) which is different from the first failure has occurred. As a result, according to the first aspect of the invention, it is possible to determine the failure of the automatic transmission, e.g., it is possible to determine, while distinguishing between, the first failure related to the neutral state of the automatic transmission and the second failure related to slipping of a frictional engaging element with which a gear speed of the automatic transmission is established.

In the first aspect, the input speed of the automatic transmission may also be used as the operating state of the automatic transmission. The estimating portion may estimate the input speed when the transmission is in the neutral state. The failure determining portion may determine, while distinguishing between, the first failure related to the neutral state of the transmission and the second failure (e.g., a failure that is related to slipping of the frictional engaging element) which is different from the first failure, based on those input speeds (e.g., based on the difference in the speeds or based on the difference in amounts).

Further, the failure determining portion may determine that the first failure related to the automatic transmission being in the neutral state has occurred when a difference between the detected input speed and the estimated input speed falls below a preset value (i.e., when the difference between the speeds is small), and determine that the second failure related to slipping of a frictional engaging element with which a gear speed of the automatic transmission is established has occurred when the difference between the detected input speed and the estimated input speed exceeds the preset value (i.e., when the difference between the speeds is large).

In the first aspect, the automatic transmission may also include a first control valve (e.g., a solenoid valve) and a second control valve (e.g., a solenoid valve), both of which control hydraulic pressure. The first control valve controls an application pressure of the frictional engaging element with which a gear speed of the automatic transmission is established and the second control valve regulates the pressure of hydraulic fluid discharged from an oil pump. The first failure related to the neutral state may be a failure of the first control valve, and the second failure related to the slipping of the frictional engaging element may be a failure of the second control valve.

When the first control valve fails, application pressure stops being supplied so the frictional engaging element is no longer able to be applied. As a result, the automatic transmission becomes in a neutral state in which torque is unable to be transmitted. When the second control valve fails, the base pressure of the hydraulic fluid decreases such that sufficient hydraulic pressure for applying the frictional engaging element is no longer able to be supplied. As a result, the frictional engaging element slips. Accordingly, when the neutral state of the automatic transmission is detected, the failure determining portion determines that the first control valve has failed. On the other hand, when slipping of the frictional engaging element is detected, the failure determining portion determines that the second control valve has failed.

Further, in the first aspect, the failure determining portion may determine, while distinguishing between, the first failure related to the neutral state and the second failure related to slipping of a frictional engaging element while the vehicle is running in a predetermined gear speed. Determination of the failure may be done when the vehicle is running in a predetermined gear speed, i.e., when the automatic transmission is not in the midst of shifting. Accordingly, because the failure determining portion will not make a failure determination when the automatic transmission is operating normally, a failure is able to be determined accurately.

Also, the failure determining portion may determine, while distinguishing between, the first failure related to the neutral state and the second failure related to slipping of a frictional engaging element when the speed of the power source has fulfilled a preset condition. That is, when the speed of the power source has fulfilled a preset condition (e.g., when the difference between the detected speed and the calculated synchronous speed is outside of a preset speed range), the failure determining portion determines, while distinguishing between, the first failure related to the neutral state of the automatic transmission and the second failure related to slipping of a frictional engaging element. Accordingly, by restricting the period during which a failure is determined, it is possible to minimize unnecessary execution of the determining routine.

A second aspect of the invention relates to a method for determining a failure in an automatic transmission in a vehicle while running, which includes the steps of: A. detecting an operating state of the automatic transmission; B. estimating the operating state when the automatic transmission is in a neutral state in which transmission of power is interrupted, based on torque input from a power source of the vehicle to the automatic transmission; C. determining whether a failure has occurred in the automatic transmission; and D. when it has been determined that the failure has occurred, determining whether that failure is a first failure related to the neutral state of the automatic transmission or a second failure that is different from the first failure, based on the detected operating state and the estimated operating state.

In step A, the operating state (e.g., an input speed) of the automatic transmission is detected. In step B, the operating state of the automatic transmission is estimated based on the torque input from the power source of the vehicle to the automatic transmission. This operating state is a state in which the automatic transmission is in a neutral state in which the transmission of power is interrupted. In step C, it is determined whether a failure has occurred in the automatic transmission. In step D, it is determined whether that failure is the first failure related to the neutral state of the automatic transmission or the second failure that is different from the first failure, based on the detected operating state and the estimated operating state (e.g., a difference in operating states, relationship between amounts, or the like). The second failure may be, for example, a failure related to slipping of a frictional engaging element with which a gear speed of the automatic transmission is established. When the detected operating state is substantially the same as the estimated operating state, it is determined in step D that the first failure relating to the neutral state has occurred in the transmission. When the detected operating state is not substantially the same as the estimated operating state, it is determined in step D that the second failure (e.g., a failure relating to slipping of the frictional engaging element) which is different from the first failure has occurred. As a result, according to the second aspect of the invention, it is possible to determine a failure of the automatic transmission, e.g., it is possible to determine, while distinguishing between, the first failure related to the neutral state of the automatic transmission and the second failure related to slipping of a frictional engaging element with which the gear speed of the automatic transmission is established.

In the second aspect of the invention, the input speed of the automatic transmission may also be used as the operating state of the automatic transmission.

Further, in the second aspect of the invention, it may be determined in the step D, when it has been determined that the failure has occurred, that that failure is a first failure related to the automatic transmission being in the neutral state has occurred when a difference between the detected input speed and the estimated input speed falls below a preset value (i.e., when the difference in speeds is small), and determined that that failure is a second failure related to slipping of a frictional engaging element with which a gear speed of the automatic transmission is established has occurred when the difference between the detected input speed and the estimated input speed exceeds the preset value (i.e., when the difference in speeds is large).

In the second aspect of the invention, the first failure related to the neutral state may be a failure of a first control valve provided in the automatic transmission, which controls an application pressure of the frictional engaging element with which a gear speed of the automatic transmission is established, and the second failure related to slipping of the frictional engaging element may be a failure of a second control valve provided in the automatic transmission, which regulates a pressure of hydraulic fluid discharged from an oil pump.

When the first control valve fails, application pressure stops being supplied so the frictional engaging element is no longer able to be applied. As a result, the automatic transmission becomes in a neutral state in which torque is unable to be transmitted. When the second control valve fails, the base pressure of the hydraulic fluid decreases such that sufficient hydraulic pressure for applying the frictional engaging element is no longer able to be supplied. As a result, the frictional engaging element slips. Accordingly, when the neutral state of the automatic transmission is detected, it is determined in step D that the first control valve has failed. On the other hand, when slipping of the frictional engaging element is detected, it is determined in step D that the second control valve has failed.

Further, in the second aspect, it may be determined in step D whether the failure is the first failure related to the neutral state of the automatic transmission or the second failure related to slipping of a frictional engaging element while the vehicle is running in a predetermined gear speed. Accordingly, determination of the failure may be done when the vehicle is running in a predetermined gear speed, i.e., when the automatic transmission is not in the midst of shifting. Accordingly, because a failure will not be determined in step D when the automatic transmission is operating normally, a failure is able to be determined accurately.

Also, in the second aspect, it may be determined in step D whether the failure is the first failure related to the neutral state or the second failure related to slipping of a frictional engaging element when the speed of the power source has fulfilled a preset condition. That is, when the speed of the power source has fulfilled a preset condition (e.g., when the difference between the detected speed and the calculated synchronous speed is outside of a preset speed range), it may be determined in step D whether the failure is the first failure related to the neutral state or the second failure related to slipping of a frictional engaging element while the vehicle is running in a certain gear speed. Accordingly, by restricting the period during which a failure is determined, it is possible to minimize unnecessary execution of the determining routine.

BRIEF DESCRIPTION OF THE DRAWINGS

FIG. 3 is a clutch application chart for the automatic transmission according to the exemplary embodiment of the invention;

DETAILED DESCRIPTION OF THE PREFERRED EMBODIMENTS

Figure 1:
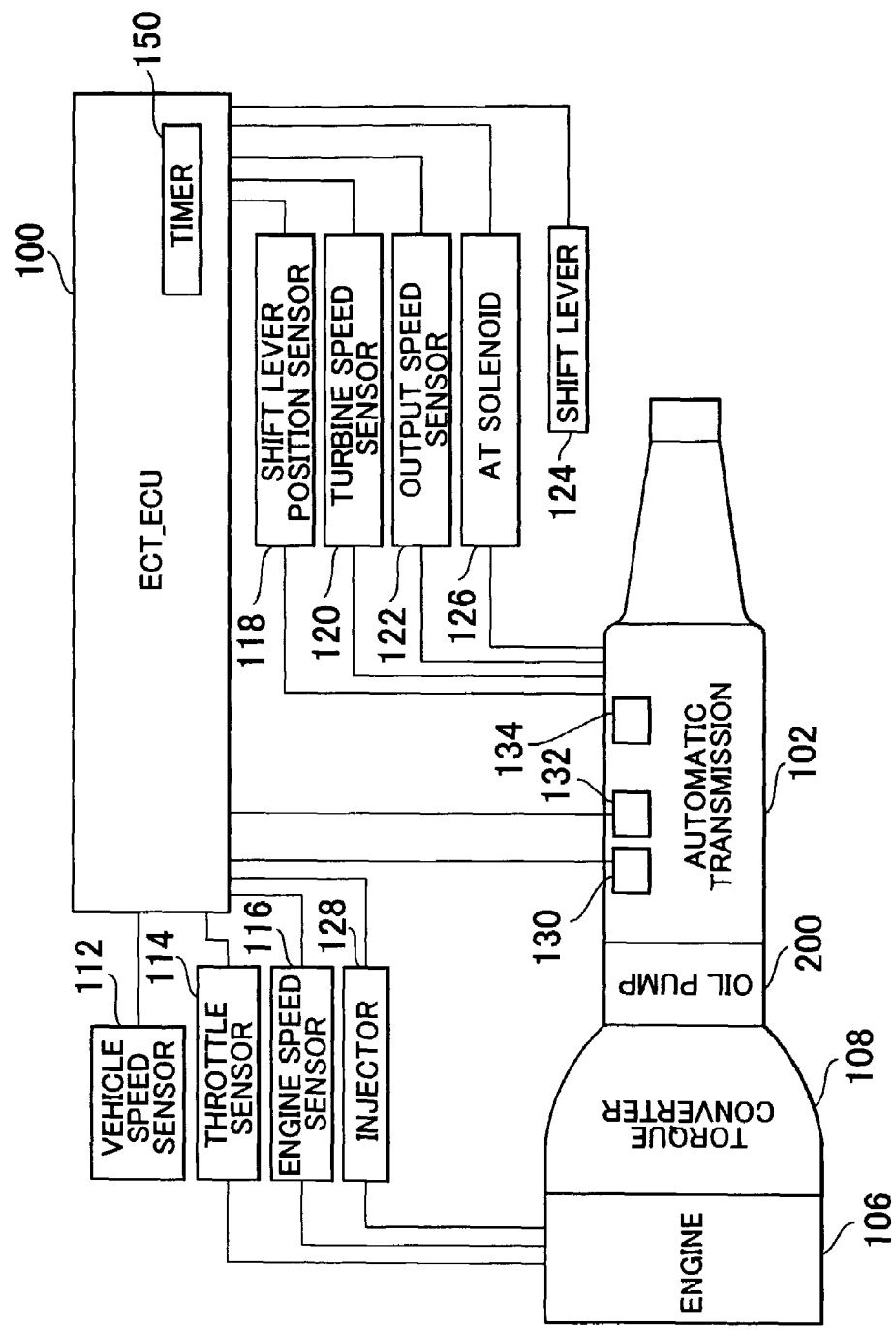
FIG. 1 is a control block diagram of a power train including an apparatus for determining a failure according to one exemplary embodiment of the invention.

Hereinafter, exemplary embodiments of the invention will be described in detail with reference to the appended drawings. In the drawings, like members will be denoted by like reference numerals throughout, and descriptions thereof are omitted.

FIG. 1 is a control block diagram of a power train including an apparatus for determining a failure according to one exemplary embodiment of the invention. The power train includes an ECT_ECU (Electronically Controlled Automatic Transmission_Electronic Control Unit) 100, an automatic transmission 102, an engine 106, a torque converter 108, and an oil pump 200. The automatic transmission 102 includes a base pressure control valve 130, a direct pressure control valve 132, and a frictional engaging element 134.

The ECT_ECU 100 detects a speed of the vehicle based on signals sent from a vehicle speed sensor 112. The ECT_ECU 100 detects a throttle opening amount based on signals sent from a throttle sensor 114. The ECT_ECU 100 also detects a speed of the engine 106 based on signals sent from an engine speed sensor 116.

The ECT_ECU 100 calculates a shift lever position of the automatic transmission 102 based on signals sent from a shift lever position sensor 118. The ECT_ECU 100 detects an input speed of the automatic transmission 102 based on signals sent from a turbine speed sensor 120. The ECT_ECU 100 detects an output speed of the automatic transmission 102 based on signals sent from an output speed sensor 122.

The ECT_ECU 100 includes a timer 150 with which it measures the processing time of the routine (e.g., the time for calculating an abnormal value). In this way, the ECT_ECU 100 may also measure the time of a routine and determine whether to execute the next routine depending on whether that time is short or long. For example, if the measured time is shorter than a preset time (i.e., when it is conceivable that an abnormality was detected only temporarily due to disturbance or some other cause), the ECT_ECU 100 can stop execution of the determination routine thereafter. Accordingly, temporary abnormalities are not made objects for determination in the determination routine so the frequency with which the failure determination routine is executed is reduced.

The ECT_ECU 100 calculates a synchronous speed (i.e., a calculated turbine speed) based on the output speed and the gear ratio of the automatic transmission 102. The ECT_ECU 100 then calculates an output torque of the engine 106 based on the throttle opening amount and a fuel injection quantity. The ECT_ECU 100 then calculates an estimated turbine speed for when the automatic transmission 102 is in a neutral state based on the calculated output torque.

"Neutral state" in this case refers to a state in which the transmission of torque input to the automatic transmission 102 is interrupted. At this time, the frictional engaging element 134 is unapplied (or slipping) to a degree whereby torque is not transmitted due to, for example, an abnormality in the direct pressure control valve 132 whereby hydraulic pressure necessary to apply the frictional engaging element 134 is not able to be generated such that a predetermined gear speed is not able to be achieved.

The ECT_ECU 100 outputs a signal to the base pressure control valve 130 and controls the base pressure (so-called line pressure) supplied to the automatic transmission 102. The ECT_ECU 100 then outputs a signal to the direct pressure control valve 132 so as to control the hydraulic pressure of the hydraulic fluid supplied to the frictional engaging element 134. The frictional engaging element 134 then becomes applied based on the hydraulic pressure of the hydraulic fluid.

Figure 2:
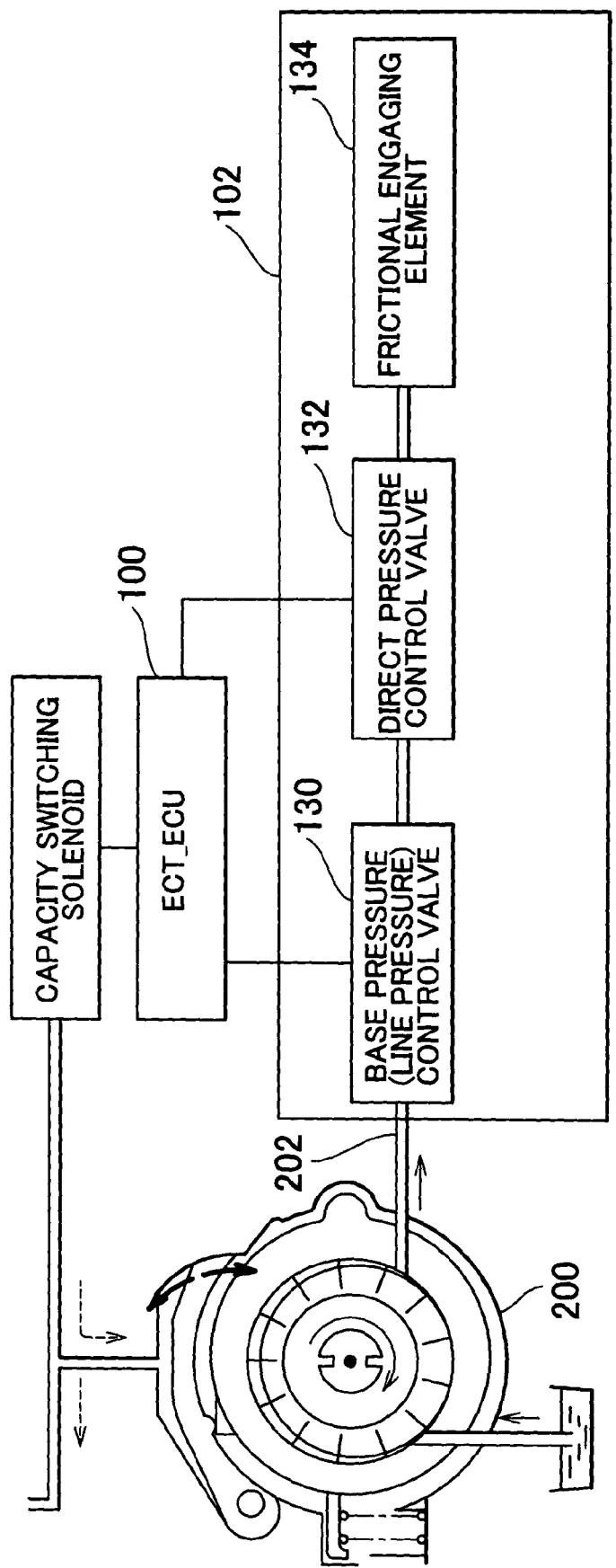
FIG. 2 is a diagram of a hydraulic pressure circuit included in the automatic transmission according to the exemplary embodiment of the invention.

FIG. 2 is a diagram of a hydraulic pressure circuit included in the automatic transmission 102 according to the exemplary embodiment of the invention. The hydraulic fluid discharged from the oil pump 200 is sent to the base pressure control valve 130 via a hydraulic fluid passage 202. The base pressure control valve 130 regulates the hydraulic pressure of the hydraulic fluid so as to generate the base pressure (i.e., line pressure). The direct pressure control valve 132 controls the base pressure so as to generate application pressure to be supplied to the frictional engaging element 134.

Referring to FIG. 2, if the base pressure control valve 130 fails, it is unable to generate sufficient base pressure so sufficient application pressure is unable to be supplied to the frictional engaging element 134. As a result, the torque capacity of the frictional engaging element 134 decreases and the frictional engaging element 134 starts to slip. Therefore, only a portion of the torque input from the engine 106 to the automatic transmission 102 is transmitted.

On the other hand, if the direct pressure control valve 132 fails, the necessary application pressure is no longer able to be supplied to the frictional engaging element 134. As a result, the frictional engaging element 134 is no longer able to transmit torque, and the automatic transmission 102 becomes in a neutral state.

In either case, the load on the engine 106 decreases so the speed of the engine 106 increases. In this case, the speed of the engine 106 when the automatic transmission 102 is in the neutral state is higher than when the frictional engaging element 134 is slipping because there is almost no load on the engine when the automatic transmission 102 is in a neutral state.

FIG. 3 is a clutch application chart for the automatic transmission 102 according to the exemplary embodiment of the invention. Reference characters "C1" to "C3" and "B1" to "B4" denote frictional engaging elements. The single circle in the chart indicates that the engaging element is applied. At this time, torque input to the automatic transmission 102 is transmitted to that engaging element. The double circle in the chart indicates that the engaging element is applied only when the engine brake is on, and the solid circle indicates that the engaging element is applied but no torque is being transmitted.

If the hydraulic pressure supplied to a frictional engaging element falls due to an abnormality of the direct pressure control valve 132, that frictional engaging element becomes unapplied. For example, referring to FIG. 3, when the automatic transmission 102 is in "4th" (i.e., fourth speed), "C1" and "C2" are applied such that torque is transmitted. Although "C3" and "B3" are also applied, they do not transmit any torque. In this state, if the hydraulic pressure supplied to one or both of the "C1" and the "C2" falls due to an abnormality of the direct pressure control valve 132, one or both of those frictional engaging elements become unapplied. That is, at least one of the "C1" and the "C2" start to slip, which interrupts transmission of the torque. In this case, because the load on the engine 106 is reduced, the turbine speed increases from the output torque of the engine 106. Accordingly, the automatic transmission 102 becomes in a neutral state.

Figure 4:
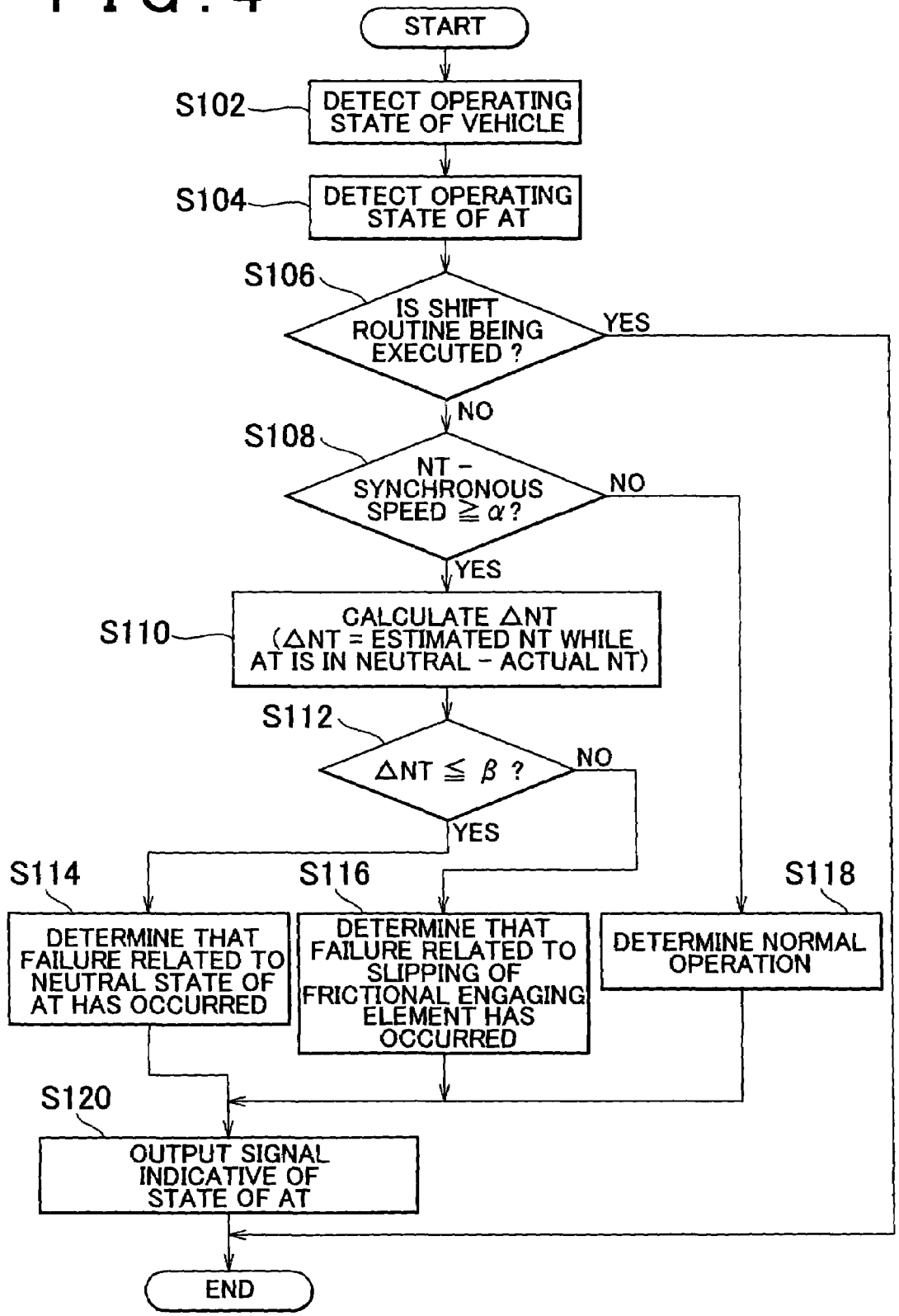
FIG. 4 is a flowchart illustrating the steps in a routine performed by the apparatus for determining a failure according to the exemplary embodiment of the invention.

The steps of the routine performed by the apparatus for determining a failure according to the exemplary embodiment of the invention will now be described based on the flowchart shown in FIG. 4.

In step S102, the ECT_ECU 100 detects the operating state (i.e., the throttle opening amount, engine speed, fuel injection quantity, intake air quantity, or the like) of the vehicle. That operating state is then used to calculate the output torque of the engine 106 or the synchronous speed or the like.

In step S104, the ECT_ECU 100 detects the operating state (i.e., shift lever position, turbine speed NT, output speed, AT solenoid signal, and the like) of the automatic transmission 102. The ECT_ECU 100 then calculates the estimated turbine speed (i.e., the engine speed) when the automatic transmission 102 is in the neutral state based on these signals.

In step S106, the ECT_ECU 100 determines whether a shifting routine of the automatic transmission 102 is being executed based on the shift lever position and the AT solenoid signal. This determination enables a shifting routine in which the turbine speed changes when the automatic transmission 102 is operating normally to be excluded as an object for the failure determination routine. When the shifting process of the automatic transmission 102 is being executed (i.e., YES in step S106), the routine ends. When the shifting process in not being executed (i.e., NO in step S106), the routine proceeds on to step S108.

In step S108, the ECT_ECU 100 determines whether a difference between the turbine speed and the synchronous speed exceeds a preset value α. When the difference between the turbine speed and the synchronous speed exceeds the preset value 60 (i.e., YES in step S108), the routine proceeds on to step S110. When the difference between the turbine speed and the synchronous speed does not exceed the preset value a (i.e., NO in step S108), the routine proceeds on to step S118.

In step S110, the ECT_ECU 100 calculates a difference (i.e., ΔNT) between the calculated estimated turbine speed and the detected actual turbine speed.

In step S112, the ECT_ECU 100 determined whether the ΔNT is smaller than a preset speed β. When it is determined that the ΔNT is smaller than the preset speed β (i.e., YES in step S112), the routine proceeds on to step S114. When it is determined that the ΔNT is not smaller than the preset speed β (i.e., NO in step S112), the routine proceeds on to step S116.

In step S114, the ECT_ECU 100 determines that there is an interruption in the transmission of torque input from the engine 106 to the automatic transmission 102, i.e., that the automatic transmission 102 is in a neutral state. In this case, hydraulic pressure is not being supplied to the frictional engaging element 134 so it is diagnose that there is an abnormality in the direct pressure control valve 132.

In step S116, the ECT_ECU 100 determines that the frictional engaging element 134 is slipping. In this case, sufficient base pressure (i.e., line pressure) is not being generated so it is diagnosed that there is an abnormality in the base pressure control valve 130. At this time, only a portion of the torque input from the engine 106 to the automatic transmission 102 is actually being transmitted. It is also conceivable that the cause for the insufficient line pressure is that the oil pump 200 is not generating sufficient pressure. Therefore, it may also be determined that there is an abnormality in the oil pump 200 as well as in the base pressure control valve 130.

In step S118, the ECT_ECU 100 determines that the torque input from the engine 106 to the automatic transmission 102 is being transmitted normally. At this time, the automatic transmission 102 and the hydraulic pressure circuit are operating normally.

In step S120, the ECT_ECU 100 outputs a signal indicative of the determined state to an indicating device or memory or the like. This signal may be, for example, a signal indicating that the automatic transmission 102 is operating normally, a signal indicating that there is an abnormality in the base pressure control valve 130, or a signal indicating that there is an abnormality in the direct pressure control valve 132, or the like. When the speed of the engine 106 increases, the state of the automatic transmission 102 can be diagnosed by this signal. Accordingly, it is easy to identify the location of the abnormality, thus facilitating quick replacement or repair of parts and the like.

Hereinafter, operation of the apparatus for determining a failure according to the exemplary embodiment of the invention will be described based on the foregoing construction and flowchart in a case in which the vehicle is running in a certain gear speed.

When the vehicle is running with the automatic transmission in a predetermined gear speed, the speed or fuel injection quantity or the like of the engine 106 is detected (step S102). Also, the output speed or turbine speed of the automatic transmission 102 is detected and the synchronous speed for that gear speed is calculated (step S104). When the automatic transmission 102 is not in the middle of a shift (i.e., NO in step S106) and the difference between the turbine speed and the synchronous speed exceeds the preset value α (i.e., YES in step S108), the difference between the estimated turbine speed when the automatic transmission 102 is in the neutral state and the actual turbine speed is calculated (step S110).

When this difference is equal to, or less than, the preset speed β (i.e., YES in step S112), it is determined that the automatic transmission 102 is in the neutral state (step S114). A signal indicative of that determination is then output (step S120). It can then be determined based on this signal that there is an abnormality in the base pressure control valve 130 of the automatic transmission 102.

Figure 5:
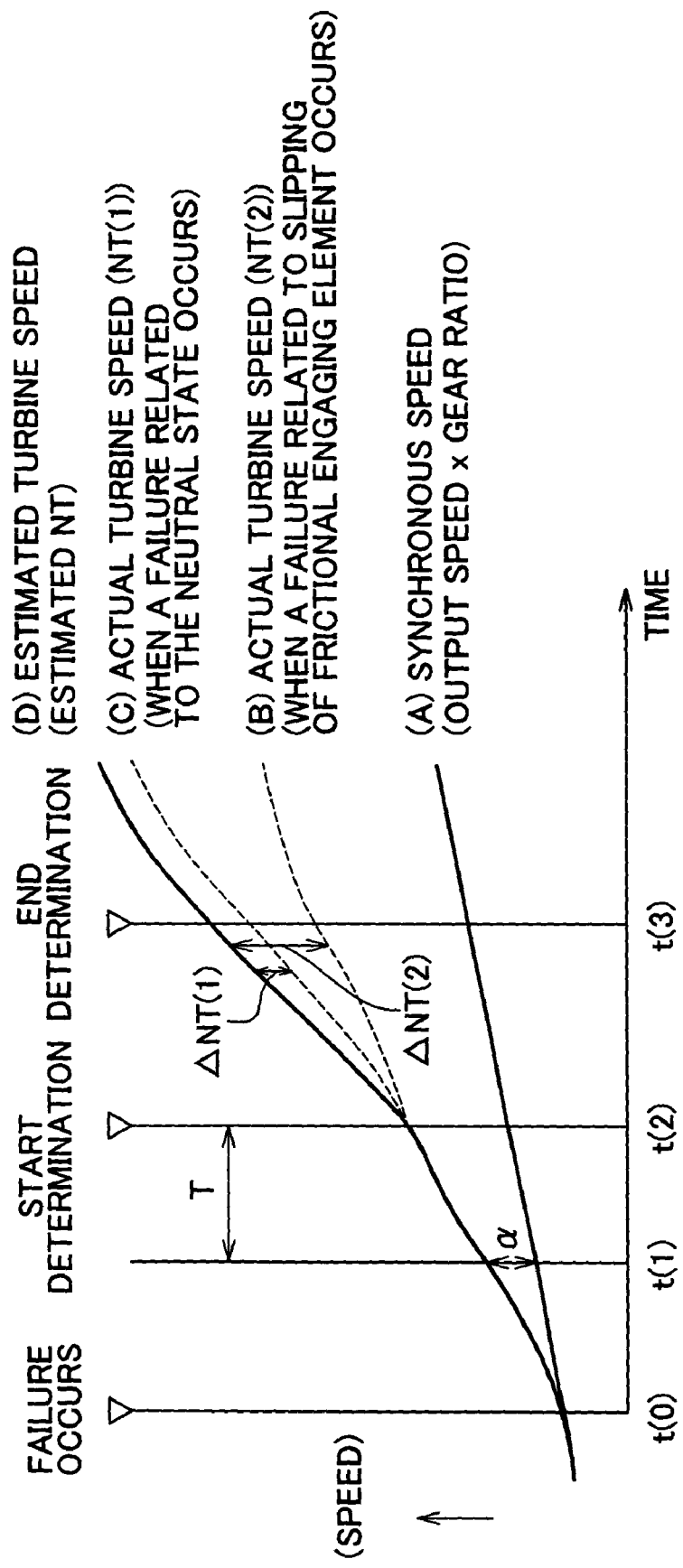
FIG. 5 is a timing chart illustrating a shift in a characteristic value of the automatic transmission according to the exemplary embodiment of the invention.

FIG. 5 is a timing chart illustrating a shift in a characteristic value of the automatic transmission according to the exemplary embodiment of the invention. The solid line (A) indicates the synchronous speed calculated from the output speed and the gear ratio of the automatic transmission 102. The dotted line (B) indicates the speed detected when the frictional engaging element is partially applied. The dotted line (C) indicates the speed detected when the automatic transmission 102 is in the neutral state. The solid line (D) indicates the estimated speed when the automatic transmission 102 is in the neutral state, which is calculated based on the torque input thereto.

Referring to FIG. 5, a failure occurs in the automatic transmission 102 at time t(0). At time t(1), the difference between the actual turbine speed and the synchronous speed exceeds the preset value α. At this time, an abnormality is detected in the automatic transmission 102.

After time T has elapsed, the ΔNT, which is the difference between the estimated turbine speed (i.e., estimated NT) and the actual turbine speed, is calculated at time t(2). For example, when the detected speed is NT(1) (i.e., dotted line (C)), ΔNT(1) is calculated. In this case, it is determined that the automatic transmission 102 is in a neutral state and that there is a failure in the direct pressure control valve 132. On the other hand, when the detected speed is ΔNT(2) (i.e., dotted line (B)), it is determined that the frictional engaging element is slipping and that there is a failure in the base pressure control valve 130.

This time T may also be set in accordance with the characteristic of the automatic transmission 102 (e.g., the amount of torque transmitted) or the state (e.g., by gear speed) of the automatic transmission 102. Accordingly, it is possible to accurately determine whether a failure has occurred.

Then, at time t(3), i.e., after the determination time (=t(3)–t(2)) elapses, a signal indicative of the state of the automatic transmission 102 is output. Accordingly, setting the determination time in this way enables the state of the automatic transmission 102 to be determined accurately.

Accordingly, it is possible to make the characteristic value (i.e., the input speed estimated when torque is not being transmitted) indicative of the state of the automatic transmission 102 a criteria for the determination. Based on this criteria, it is possible to determine the cause of the speed of the engine 106 increasing above the synchronous speed (i.e., the speed calculated based on the output speed and the gear ratio of the automatic transmission 102). That is, when the automatic transmission 102 is in the neutral state in which no torque is being transmitted, it is estimated that there is a failure in the direct pressure control valve 132. On the other hand, when the frictional engaging element is slipping such that not enough torque is being transmitted, it is determined that there is an abnormality in the base pressure control valve 130. Accordingly, it is possible to provide an apparatus for determining a failure, which is capable of accurately determining the cause of the increase in the speed of the power source.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. An apparatus for determining a failure in an automatic transmission in a vehicle while running, comprising:
    a first detecting portion which detects an input speed of the automatic transmission;
    an estimating portion which estimates an input speed of the automatic transmission when the automatic transmission is in a neutral state in which transmission of power is interrupted, based on torque input from a power source of the vehicle to the automatic transmission; and
    a failure determining portion which determines, whether the failure in the automatic transmission is a first failure related to the neutral state of the automatic transmission or a second failure that is different from the first failure, based on the detected input speed and the estimated input speed, wherein the failure determining portion determines that the first failure related to the automatic transmission being in the neutral state has occurred when a difference between the detected input speed and the estimated input speed falls below a preset value, and determines that the second failure related to slipping of a frictional engaging element with which a gear speed of the automatic transmission is established has occurred when the difference between the detected input speed and the estimated input speed exceeds the preset value.

2. The apparatus according to claim 1, wherein the failure determining portion determines, whether the failure n the automatic transmission is the first failure related to the neutral state or the second failure related to slipping of a frictional engaging element while the vehicle is running in a predetermined gear speed.

3. The apparatus according to claim 1, further comprising:
a second detecting portion which detects a speed of a power source of the vehicle,
wherein the failure determining portion determines whether the failure in the automatic transmission is the first failure related to the neutral state or the second failure related to slipping of a frictional engaging element when the speed of the power source has fulfilled a preset condition.

4. The apparatus according to claim 1, wherein the automatic transmission includes a first control valve and a second control valve, both of which control hydraulic pressure; the first control valve controls an application pressure of the frictional engaging element with which a gear speed of the automatic transmission is established and the second control valve regulates the pressure of hydraulic fluid discharged from an oil pump; and the first failure related to the neutral state is a failure of the first control valve, and the second failure related to slipping of the frictional engaging element is a failure of the second control valve.

5. A method for determining a failure in an automatic transmission in a vehicle while running, comprising the steps of:
A. detecting an input speed of the automatic transmission;
B. estimating an input speed of the automatic transmission when the automatic transmission is in a neutral state in which transmission of power is interrupted, based on torque input from a power source of the vehicle to the automatic transmission;
C. determining whether a failure has occurred in the automatic transmission; and
D. determining, when it has been determined that the failure has occurred, whether the failure in the automatic transmission is a first failure related to the neutral state of the automatic transmission or a second failure that is different from the first failure, based on the detected input speed and the estimated input speed, wherein it is determined in step D that the failure is the first failure related to the automatic transmission being in the neutral state has occurred when a difference between the detected input speed and the estimated input speed falls below a preset value, or that the second failure related to slipping of a frictional engaging element with which a gear speed of the automatic transmission is established has occurred when the difference between the detected input speed and the estimated input speed exceeds the preset value.

6. The method according to claim 5, wherein it is determined in step D whether the failure is the first failure related to the neutral state of the automatic transmission or the second failure related to slipping of a frictional engaging element while the vehicle is running in a predetermined gear speed.

7. The method according to claim 5, further comprising the step of:
E. detecting a speed of a power source of the vehicle,
wherein it is determined in step D whether the failure is the first failure related to the neutral state or the second failure related to slipping of a frictional engaging element when the speed of the power source has fulfilled a preset condition.

8. The method according to claim 5, wherein the first failure related to the neutral state is a failure of a first control valve provided in the automatic transmission, which controls an application pressure of the frictional engaging element with which a gear speed of the automatic transmission is established, and the second failure related to slipping of the frictional engaging element is a failure of a second control valve provided in the automatic transmission, which regulates a pressure of hydraulic fluid discharged from an oil pump.

* * * * *

UNITED STATES PATENT AND TRADEMARK OFFICE
CERTIFICATE OF CORRECTION

PATENT NO. : 7,058,497 B2  
APPLICATION NO. : 10/667454  
DATED : January 6, 2006  
INVENTOR(S) : Koji Nagata et al.

Page 1 of 1

It is certified that error appears in the above-identified patent and that said Letters Patent is hereby corrected as shown below:

| Column | Line | |
|---|---|---|
| 8 | 43 | Change "value 60" to --value α--. |
| 8 | 46 | Change "value a" to --value α--. |
| 10 | 65 | After "determines" delete ",". |
| 11 | 16 | After "determines" delete ",". |

Signed and Sealed this

Sixth Day of November, 2007

JON W. DUDAS  
*Director of the United States Patent and Trademark Office*

UNITED STATES PATENT AND TRADEMARK OFFICE
CERTIFICATE OF CORRECTION

PATENT NO. : 7,058,497 B2 Page 1 of 1
APPLICATION NO. : 10/667454
DATED : June 6, 2006
INVENTOR(S) : Koji Nagata et al.

It is certified that error appears in the above-identified patent and that said Letters Patent is hereby corrected as shown below:

| Column | Line | |
|--------|------|---|
| 8 | 43 | Change "value 60" to --value $\alpha$--. |
| 8 | 46 | Change "value a" to --value $\alpha$--. |
| 10 | 65 | After "determines" delete ",". |
| 11 | 16 | After "determines" delete ",". |

This certificate supersedes Certificate of Correction issued November 6, 2007.

Signed and Sealed this

Fourth Day of December, 2007

JON W. DUDAS
*Director of the United States Patent and Trademark Office*